US 6,526,433 B1

(12) United States Patent
Chang et al.

(10) Patent No.: US 6,526,433 B1
(45) Date of Patent: Feb. 25, 2003

(54) ADAPTIVE TIMEOUT VALUE SETTING FOR DISTRIBUTED COMPUTING ENVIRONMENT (DCE) APPLICATIONS

(75) Inventors: Frances Chang, Austin, TX (US); I-Lung Kao, Round Rock, TX (US); Chiang-lung Lin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/461,972

(22) Filed: Dec. 15, 1999

(51) Int. Cl.[7] ............................................... G06F 11/30
(52) U.S. Cl. ........................ 709/201; 709/330; 709/224; 709/203; 709/228; 709/230; 709/221
(58) Field of Search ................................. 709/201, 224, 709/330, 203, 102, 105, 230, 228, 232, 220, 221

(56) References Cited

U.S. PATENT DOCUMENTS

| | | | | |
|---|---|---|---|---|
| 5,497,463 A | * | 3/1996 | Stein et al. ................... | 709/203 |
| 5,682,534 A | * | 10/1997 | Kapoor et al. ............... | 709/328 |
| 5,699,511 A | * | 12/1997 | Porcaro et al. ............... | 714/55 |
| 6,366,958 B1 | * | 4/2002 | Ainsworth et al. .......... | 709/230 |

* cited by examiner

Primary Examiner—Kenneth R. Coulter
(74) Attorney, Agent, or Firm—Leslie A. Van Leeuwen; Bracewell & Patterson, L.L.P.

(57) ABSTRACT

An adaptive timeout value setting is determined for DCE applications, wherein the timeout value setting is adapted and adjusted according to environmental factors and communication conditions between a client/server pair. The adaptive timeout value setting takes into consideration the communication time between a client and a server in each client/server pair in determining and setting a timeout value for each pair. The timeout value for a client/server pair is adjusted in a dynamic fashion so that the client is able to be more adaptive to real environment changes and so that the server's performance is not degraded due to ineffective timeouts. The system and method determines an adaptive timeout value setting in distributed computing environment (DCE) applications for a client/server pair wherein each pair has a client system and a server system. A server response time of the server system is tracked to a remote procedure call from the client system. The remote procedure call includes a binding handle, and the server response time is based on a time of the server system responding to the remote procedure. An optimal timeout value is calculated from the response time, and a timeout value of the binding handle is reset as the optimal timeout value.

18 Claims, 5 Drawing Sheets

ADAPTIVE TIMEOUT VALUE SETTING FOR DISTRIBUTED COMPUTING ENVIRONMENT (DCE) APPLICATIONS

BACKGROUND OF THE INVENTION

1. Technical Field

The present invention relates in general to a timeout value setting for distributed computing environment (DCE) applications and, in particular, to an adaptive timeout value setting for DCE applications wherein the timeout value setting is adapted and adjusted according to environmental factors and communication conditions between a client and a server.

2. Description of the Related Art

In a computer network, communications between a client and a server are well known in the art. A DCE Remote Procedure Call (RPC) provides applications with an Application Programming Interface (API), such as rpc_mgmt_set_com_timeout, to set the timeout value for communications between a client and a server. The timeout value is set at a particular value when the client code populates the binding handle (i.e. during client code compilation time) used to communicate with the server and is generally fixed at that particular value throughout the entire communication session. If the timeout value is not set by the client, a default value is set during the RPC runtime. The most current DCE version of the timeout value provides features to set the default timeout value by the application client at runtime (i.e. such as using environment variables).

In either case, the setting of a timeout value is and done ahead of time by the client (i.e. either at client code compilation time or runtime). This set value is then used through the entire communication session. The static timeout value setting results in drawbacks because it is limited in its setting and it does not consider significant environmental factors and communication conditions that should drive the occurrences of a timeout. For example, in the client/server environment, a server's response may be reduced considerably due to an increasing workload or network congestion. The client's original timeout value may not have been set long enough to accommodate the performance change, and a pre-mature exiting at the client side when the set timeout value has been reached may result. Furthermore, if the client program is written to try to connect again or if the user attempts to re-run the client code under this case, then the attempt will further contribute to the already congested network traffic or to the server's workload, and the attempt may very well cause another timeout at the client side. On the other hand, if the timeout value has been reset to a large value by either the client application or local environment variables responding to the timeout condition, disadvantages may still exist. For example, when a server's workload becomes less busy or the network becomes less congested, then the timeout being set at a large timeout value causes the timeout mechanism to be less responsive. In other words, the client may need to wait for an excessive time period before reaching a timeout when the server fails to respond for any reason.

It would therefore be advantageous and desirable to provide an adaptive timeout value setting for DCE applications wherein the timeout value setting is adapted and adjusted according to environmental factors and communication conditions between each client/server pair. It would also be advantageous and desirable to provide an adaptive timeout value that takes into consideration the communication time between a client and a server in each client/server pair in determining and setting a timeout value for it. It would also be advantageous and desirable to provide such an adaptive timeout value setting that is implemented in DCE RPC runtime and that is transparent to any DCE application client and any DCE application server. It would further be advantageous and desirable to adjust the timeout value for each client/server pair in a dynamic fashion so that the client is able to be more adaptive to real environment changes and so that the server's performance is not degraded due to ineffective timeouts. It would still also be advantageous and desirable to allow the distributed computing environment instead of the client to be responsible for the timeout value setting so that it does not have to be blindly and indiscriminately determined. It would still further be advantageous and desirable to avoid having to incur any programming and administration overhead for setting timeout values by DCE applications. It would still also be advantageous and desirable to determine a reasonable timeout value based and built on the infrastructure of the client/server applications rather than based on the client's program or the user running the client. It would still further be advantageous and desirable to dynamically set or adjust the client's timeout value based on the server's workload and/or the network traffic in a programmatic way.

SUMMARY OF THE INVENTION

It is therefore one object of the present invention to provide an adaptive timeout value setting for DCE applications wherein the timeout value setting is adapted and adjusted according to environmental factors and communication conditions between each client/server pair.

It is another object of the present invention to provide an adaptive timeout value that takes into consideration the communication time between a client and a server in each client/server pair in determining and setting a timeout value for it.

It is another object of the present invention to provide such an adaptive timeout value setting that is implemented in DCE RPC runtime and that is transparent to any DCE application client and any DCE application server.

It is a further object of the present invention to adjust the timeout value for each client/server pair in a dynamic fashion so that the client is able to be more adaptive to real environment changes and so that the server's performance is not degraded due to ineffective timeouts.

It is still another object of the present invention to allow the distributed computing environment instead of the client to be responsible for the timeout value setting so that it does not have to be blindly and indiscriminately determined.

It is still a further object of the present invention to avoid having to incur any programming and administration overhead for setting timeout values by DCE applications.

It is still also another object of the present invention to determine a reasonable timeout value based and built on the infrastructure of the client/server applications rather than based on the client's program or the user running the client.

It is still a further object of the present invention to dynamically set or adjust the client's timeout value based on the server's workload and/or the network traffic in a programmatic way.

The foregoing objects are achieved as is now described. An adaptive timeout value setting for DCE applications is determined, wherein the timeout value setting is adapted and adjusted according to environmental factors and communication conditions between a client and a server. The adaptive timeout value setting takes into consideration the communication time between each client/server pair in determining and setting a timeout value for each pair. The timeout value for each client/server pair is adjusted in a dynamic fashion so that the client is able to be more adaptive to real environment changes and so that the server's performance is not degraded due to ineffective timeouts. The present system and method implements and provides an adaptive timeout value setting for DCE applications. At least one response time, which is to at least one remote procedure call that each has a binding handle, is tracked. The at least one remote procedure call is from at least one client system and the at least one response time is based on at least one time of at least one server system responding to the at least one remote procedure call. An optimal timeout value is calculated from the at least one response time, and a timeout value of the binding handle is reset as the optimal timeout value.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is an adaptive timeout value setting for DCE applications wherein the timeout value setting is adapted and adjusted according to environmental factors and communication conditions between each client/server pair. The present invention provides an adaptive timeout value that takes into consideration the communication time between a client and a server in each client/server pair in determining and setting a timeout value for each pair. The present invention provides such an adaptive timeout value setting that is implemented in DCE RPC runtime and that is transparent to any DCE application client and any DCE application server. The present invention further adjusts the timeout value for each client/server pair in a dynamic fashion so that the client is able to be more adaptive to real environment changes and so that the server's performance is not degraded due to ineffective timeouts. The present invention also allows the distributed computing environment instead of the client to be responsible for the timeout value setting so that it does not have to be blindly and indiscriminately determined. The present invention still also avoids having to incur any programming and administration overhead for setting timeout values by DCE applications. The present invention also determines a reasonable timeout value based and built on the infrastructure of the client/server applications rather than based on the client's program or the user running the client. The present invention further dynamically sets or adjusts the client's timeout value based on the server's workload and/or the network traffic in a programmatic way.

Figure 1:
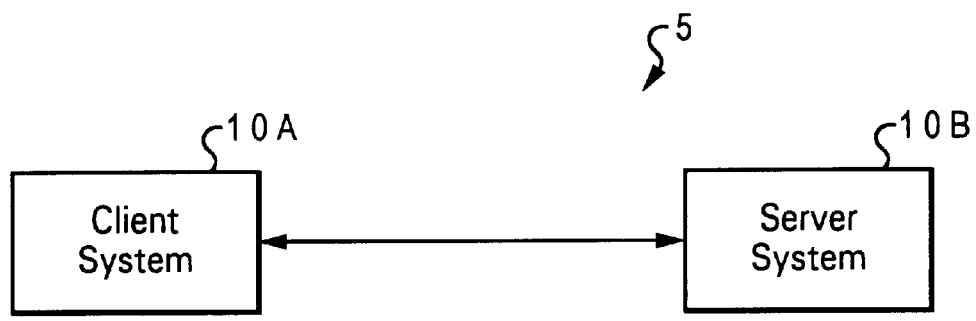
FIG. 1 is a block diagram illustrating communications between a client/server pair for implementing the present invention adaptive timeout value setting for DCE applications.

With reference now to the figures and in particular with reference to FIG. 1, a block diagram 5 illustrating communications between a client system 10A and a server system 10B (i.e. a client/server pair) for implementing the present invention adaptive timeout value setting for DCE applications is shown. FIG. 1 illustrates a basic DCE application by showing a client system 10A in communications with a server system 10B. The present invention adaptive timeout value setting is able to be implemented at the side of the client system 10A.

Figure 2:
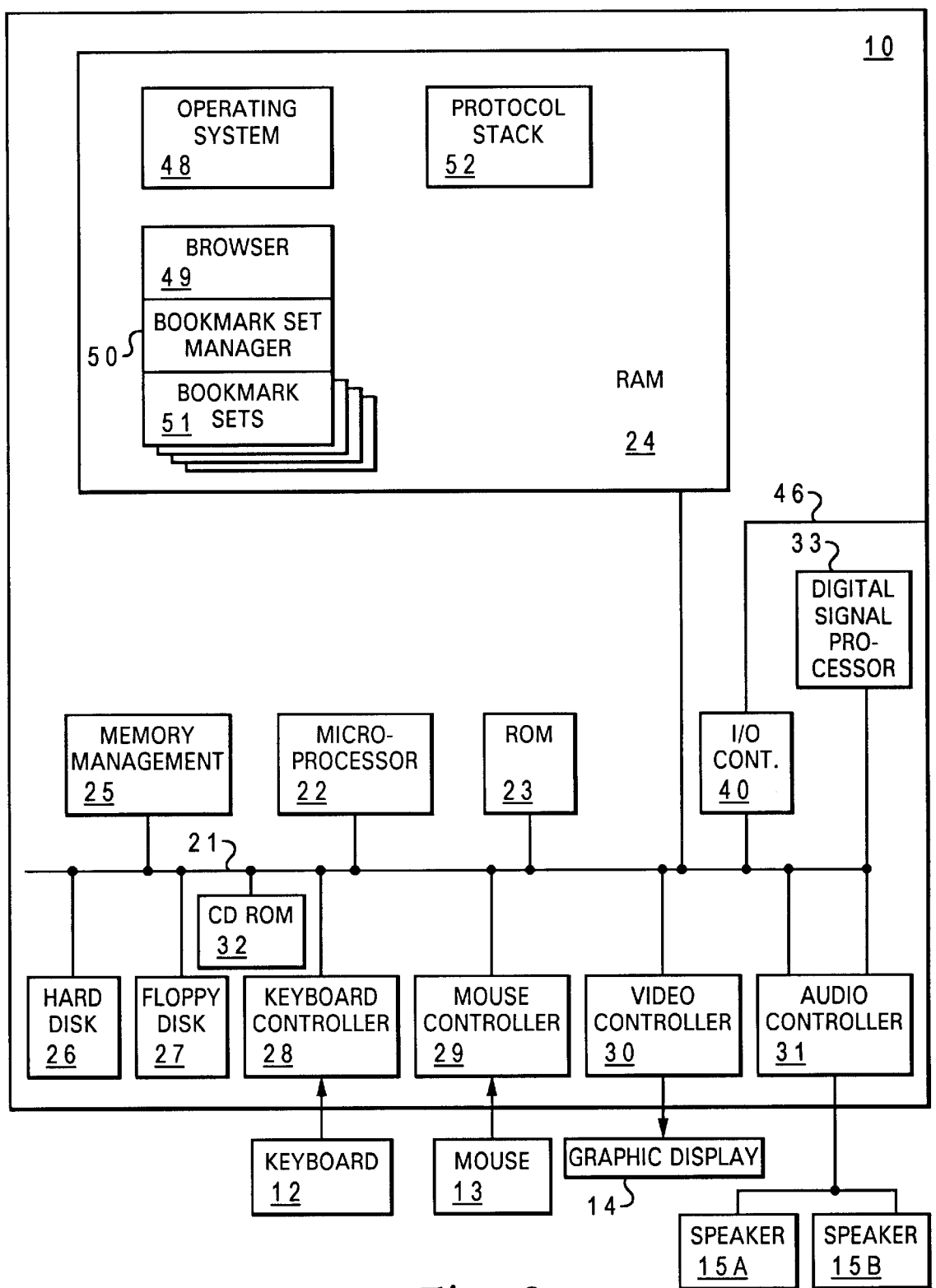
FIG. 2 is a block diagram of an example hardware system that may be the client system or the server system of FIG. 1.

With reference now to the figures and in particular with reference to FIG. 2, an overall block diagram of an example hardware system 10 for either the client system 10A or the server system 10B of FIG. 1 is shown. The hardware system 10 is generally a computer system or a server system that is able to access and communicate within a DCE, such as a distributed system, network, and/or on the Internet or World Wide Web. The hardware system 10 has a number of computer sub-systems in communications with or to each other on a communications bus 21. The various computer sub-systems coupled to the bus 21 include but are not limited to the following systems or devices: a memory management system 25, a microprocessor 22, a read only memory (ROM) system 23, a random access memory (RAM) system 24, an input/output controller (I/O CONT.) 40, a digital signal processor 33, a hard disk 26, a floppy disk 27, a CD ROM 32, a keyboard controller 28, a mouse controller 29, a video controller 30, and an audio controller 31. The I/O CONT. 40 provides communications to an input/output device via line 46. A keyboard 12 is coupled to the keyboard controller 28. A mouse 13 is coupled to the mouse controller 29. A graphic display 14 is coupled to the video controller 30. Speakers 15A and 15B are coupled to the audio controller 31. The RAM system 24 is divided into at least the following memory allocations: 1) operating system 48; 2) protocol stack 52; 3) a browser or web browser 49; 4) a bookmark set manager 50; and 5) bookmark sets 51. The present invention is not in any way limited to the specific hardware disclosed above for the system 10 that provides a client system 10A and/or 10B, and any suitable system, sub-system, and/or device may be used to implement the present invention or in conjunction with the present invention. Furthermore, the present invention is not limited to the specific implementation and application disclosed in this specification, and the present invention is able to be implemented in any suitable use or application.

Figure 3:
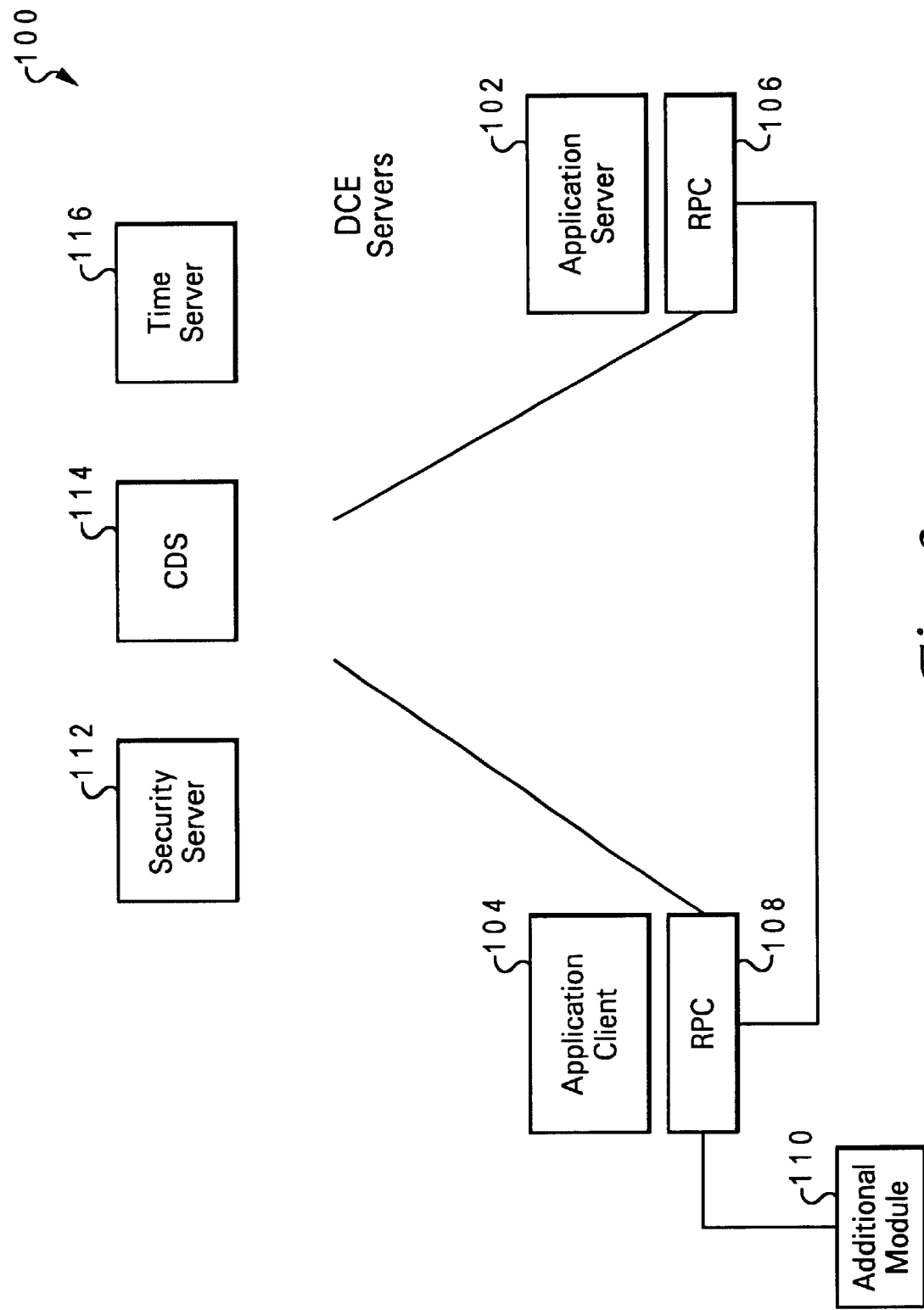
FIG. 3 is a block diagram of the topology for the present invention adaptive timeout value setting for DCE applications wherein an additional module is shown to be used for computing the optimal timeout value.

With reference now to the figures and in particular with reference to FIG. 3, a block diagram 100 of the topology for the present invention adaptive timeout value setting for DCE applications is shown. FIG. 3 shows more details of the present invention adaptive timeout value setting. An additional module is shown as part of the topology which is used for computing the optimal timeout value. FIG. 3 shows an application 104 (i.e. software or computer application) used at the client system 10A ("application client 10A") that is in communications with various DCE servers, such as a security server 112, a cell directory service (CDS) 114, a time server 116, and, of course, a server system 10B having an application 102 (i.e. application server 10B). Furthermore, the application server 10B having application 102 is also in communications with such DCE servers (i.e. security server 12, CDS 114, a time server 116) and, of course, with the client 10A having application 104 (i.e. application client 10A). FIG. 3 shows that the client/server pair comprising an application client 10A and an application server 10B communicate to each other through remote procedure calls ("RPCs") 106 and 108.

An additional module 110 is preferably added and coupled to the RPC routine libraries 108 at the client side. The additional module 110 comprises an executable method (i.e. such as the method 50 in FIG. 4) that computes an optimal timeout value, and it also stores and maintains the data structures used for defining the data used in that method. As shown in FIG. 3, this additional module 110 is preferably added to the internal libraries of the RPC 108 on the client side 10A. A binding handle is used to point to a data structure that comprises general information that allows the application client 10A and the application server 10B of the client/server pair to communicate to each other through the RPCs 108 and 106. The general information that makes up the data structure preferably includes, but is not limited to, host name and port number, the application functions that the server provides, the low level network protocol (TCP, UDP, etc.) that is being supported, etc. Whenever the application client 10A attempts to communicate with the application server 10B through the RPCs 108 and 106, then the application client 10A identifies all of the information about the application server 10B stores it with the binding handle. When the client system 10A uses a binding handle to talk to the server system 10B through the RPCs 108 and 106, the timeout value associated with the binding handle is recomputed by the additional module 110 for the client/server pair. This re-computation is done on the client side only since the server system 10B usually does not keep track of communication time and since the server system 10B also typically serves many other client system. Each client system 10A, however, is concerned about its own communication time with a server 10B in a respective client/server pair.

Figure 4:
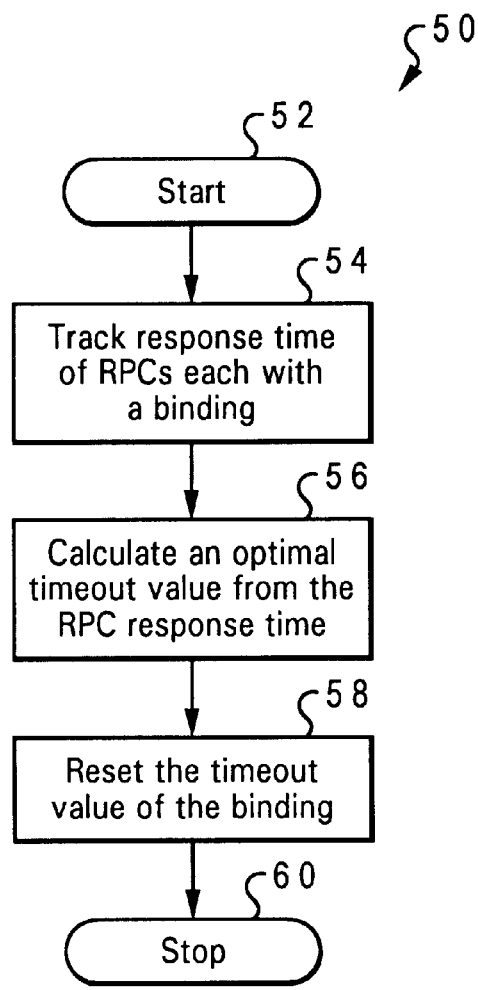
FIG. 4 is a flow chart of the general method for implementing and providing the present invention adaptive timeout value setting for DCE applications.

With reference now to the figures and in particular with reference to FIG. 4, a flow chart of the general method 50 for implementing and providing the present invention, adaptive timeout value setting of a client/server pair for DCE applications, is shown. This method 50 is separately implemented and executed for each client/server pair. The general method 50 is preferably implemented at and by the additional module 110 of FIG. 3. The method 50 starts at block 52. The method 50 moves to block 54 where the response time(s) to an RPC(s) 108 that comprise(s) and is/are associated to a binding handle is tracked. Further details regarding block 54 are discussed below with reference to FIG. 5. The method 50 then moves to block 56. At block 56, an optimal timeout value is calculated from the RPC response time(s) determined from block 54. Further details regarding block 56 are discussed below with reference to FIG. 6. The method 50 then moves to block 58. At block 58, the timeout value of the binding handle is reset to the calculated optimal timeout value determined at block 56. Further details regarding block 58 are discussed below with reference to FIG. 7. The method 50 ends or stops at block 60. This series of method steps is executed and run after each communication session between the client system 10A and server system 10B in a client/server pair so that the best or optimal timeout value for that pair is generally obtained and reset to the RPC binding handle.

Figure 5:
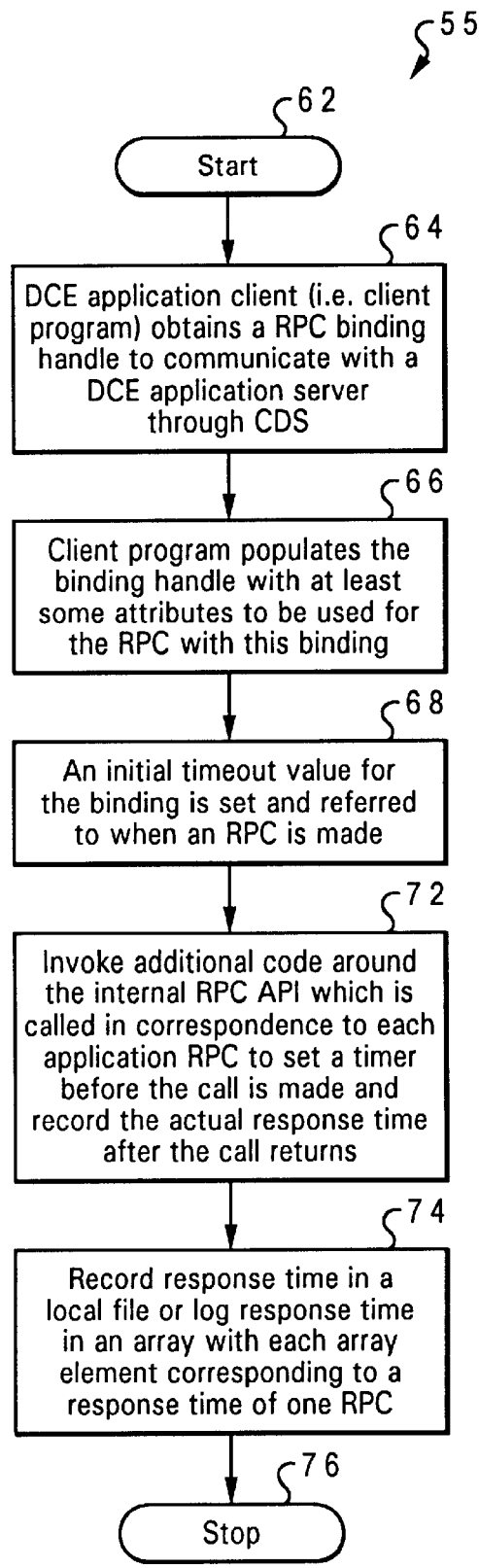
FIG. 5 is a flow chart illustrating more specific steps for the tracking step in the general method of FIG. 4.

With reference now to the figures and in particular with reference to FIG. 5, a flow chart method 55 illustrating more specific steps for the tracking step of block 54 in the general method 50 of FIG. 4 is shown. The flow chart method 55 starts at block 62. The flow chart method 55 moves to block 64. At block 64, the DCE application client 10A (i.e. with client program or application 104) obtains a RPC binding handle to communicate with the DCE application server 10B through a cell directory service (CDS). The flow chart method 55 moves to block 66. At block 66, after the application client 10A obtains a RPC binding handle, the application client 10A populates the binding handle with at least some attributes to be used for the RPC 108 with this binding handle. The flow chart method 55 moves to block 68. At block 68, an initial timeout value for the binding handle is set at this time, and the timeout value is referred to when an RPC 108 is made from the application client 1OA to the application server 10B of the client/server pair. The flow chart method 55 moves to block 72. At block 72, additional code within the RPC runtime libraries is invoked in correspondence to each RPC to set a timer before the RPC is made and to record the actual response time after the RPC returns. The flow chart method 55 moves to block 74. At block 74, the response time is recorded in a local file or logged in an array with each array element corresponding to a response time of one RPC 108. The flow chart method 55 ends at block 76.

Figure 6:
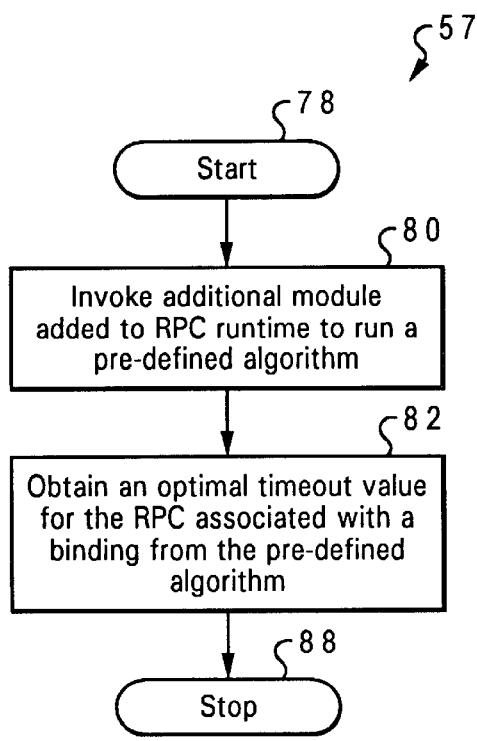
FIG. 6 is a flow chart illustrating more specific steps for the calculating step in the general method of FIG. 4.

With reference now to the figures and in particular with reference to FIG. 6, a flow chart method 57 illustrating more specific steps for the calculating step of block 56 in the general method 50 of FIG. 4 is shown. The flow chart method 57 starts at block 78. The flow chart method 57 moves to block 80 where an additional module 110 that is added to the RPC runtime is invoked to run a pre-defined method in order to obtain an optimal timeout value for the RPC(s) 108. The method 57 needs to use the response time values gathered and obtained from the tracking step (i.e. block 54 of FIG. 5). The method 57 moves to block 82 where an optimal timeout value is obtained for the RPC associated with a binding from the pre-defined method. The flow chart method 57 ends or stops at block 88.

The pre-defined methods in blocks 80 and 82 are each not limited to any specific method, and any suitable method may be used for calculating an optimal timeout value. For example, one such method may be that the optimal value is calculated from a simple formula such as two times the largest value (i.e. largest response time) in the response time array. Another such method may involve a more complicated formula in which the optimal value is obtained from some type of heuristics or statistics calculation. An example of such heuristics or statistics calculation may involve tracking and obtaining the most recent twenty-five (25) elements or values (i.e. the last 25 response times) from the response time array. The average and standard deviations are computed for these response time values. The optimal value is obtained as the sum of the average plus three standard deviations. Of course, the "quality" of the pre-defined method determines how fine the timeout value is able to be tuned to reflect the real environment. The choice of the method also determines the size of the array. In the first example, the size of the array is just one because only the largest value needs to be tracked and stored. In the second example, the size of the array needs to be twenty five in order to track and store the twenty five most recent RPC response times.

Figure 7:
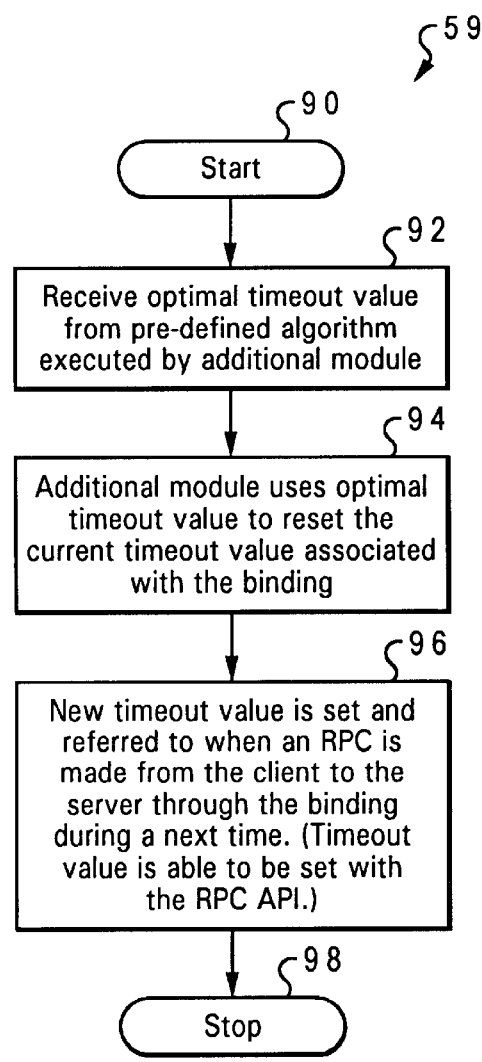
FIG. 7 is a flow chart illustrating more specific steps for the resetting step in the general method of FIG. 4.

With reference now to the figures and in particular with reference to FIG. 7, a flow chart method 59 illustrating more specific steps for the resetting step of block 58 in the general method 50 of FIG. 4 is shown. The flow chart method 59 starts at block 90. The flow chart method 59 moves to block 92 where the optimal timeout value is received from the pre-defined method executed by the additional module 110, which was discussed earlier. The flow chart 59 moves to block 94. At block 94, the additional module 110 uses the optimal timeout value to reset the current timeout value associated with the binding handle. The flow chart method 59 moves to block 96. At block 96, the new timeout value is set and referred to through the binding handle when an RPC 108 is made from the client system 10A to the RPC 106 at the server system 10B during a next time call. The timeout value is able to be set with a specific RPC API. The flow chart method 59 ends or stops at block 98.

The present invention provides a method and system for setting a timeout value that reflects environmental factors and communication conditions. The present invention is able to be used and implemented in various distributed system infrastructures on which client/server applications are able to be constructed and in which timeouts are expected to happen. Due to the sensitivity to the environment change, the method and system are especially useful for the environment where the server's workload and network traffic condition vary with time significantly. Furthermore, the cost of implementing the present invention is relatively inexpensive. Also, the runtime performance in adding the present invention functions depends on the method to compute the optimal timeout value, but it is relatively small compared to the overhead of handling all the communication work (like in RPC runtime) between a client system 10A and a server system 10B.

While the invention has been particularly shown and described with reference to a preferred embodiment, it will be understood by those skilled in the art that various changes in form and detail may be made therein without departing from the spirit and scope of the invention.

What is claimed is:

1. A method for determining an adaptive timeout value setting in distributed computing environment (DCE) applications for a client/server pair having a client system and a server system, comprising the steps of:
    tracking a server response time of the server system to a remote procedure call from the client system, wherein the remote procedure call includes a binding handle, and wherein the server response time is based on a time of the server system responding to the remote procedure,
    calculating an optimal timeout value from the response time, and
    resetting a timeout value of the binding handle as the optimal timeout value.

2. The method according to claim 1, wherein the tracking step further comprises the steps of:
    obtaining, by the client system, the binding handle to communicate with the server system,
    populating, by the client system, the binding handle with attributes to be used for the remote procedure call with the binding handle,
    setting and referring to an initial value for the timeout value of the binding handle when one of the remote procedure call is made,
    invoking additional code that is added around an internal remote procedure call application programming interface which is called in correspondence to the remote procedure call to set a timer before the remote procedure call is made and to record the response time after the remote procedure call is returned, and
    recording the response time in a storage array having a number of array elements wherein one of the array elements corresponds to the response time for the remote procedure call.

3. The method according to claim 1, wherein the calculating step further comprises the steps of:
    invoking an additional module that is added to a runtime of the remote procedure call to execute a pre-defined method, and
    obtaining the optimal timeout value for the remote procedure call associated with the binding handle from the pre-defined method.

4. The method according to claim 3, wherein the pre-defined method is a largest response time method wherein a largest value of the response time in the storage array is used for computing the optimal timeout value.

5. The method according to claim 3, wherein the pre-defined method is a heuristics or statistics calculation method wherein average values and standard deviations derived from values of the response time in the storage array are used for computing the optimal timeout value.

6. The method according to claim 1, wherein the resetting step further comprises the steps of:
    receiving the optimal timeout value from a pre-defined method executed by an additional module,
    using, by the additional module, the optimal timeout value to reset the timeout value associated with the binding handle, and
    setting the timeout value with the optimal timeout value when the remote procedure call is made from the client system to the server system through the binding handle during a next remote procedure call.

7. A system for determining an adaptive timeout value setting in distributed computing environment (DCE) applications for a client/server pair having a client system and a server system, comprising:
    means for tracking a server response time of the server system to a remote procedure call from the client system, wherein the remote procedure call includes a binding handle, and wherein the server response time is based on a time of the server system responding to the remote procedure,
    means for calculating an optimal timeout value from the response time, and
    means for resetting a timeout value of the binding handle as the optimal timeout value.

8. The system according to claim 7, wherein the means for tracking further comprises:
    means for obtaining, by the client system, the binding handle to communicate with the server system,
    means for populating, by the client system, the binding handle with attributes to be used for the remote procedure call with the binding handle,
    means for setting and referring to an initial value for the timeout value of the binding handle when one of the remote procedure call is made, means for invoking additional code that is added around an internal remote procedure call application programming interface which is called in correspondence to the remote procedure call to set a timer before the remote procedure call is made and to record the response time after the remote procedure call is returned, and means for recording the response time in a storage array having a number of array elements wherein one of the array elements corresponds to the response time for the remote procedure call.

9. The system according to claim 7, wherein the means for calculating further comprises:

means for invoking an additional module that is added to a runtime of the remote procedure call to execute a pre-defined method, and means for obtaining the optimal timeout value for the remote procedure call associated with the binding handle from the pre-defined method.

10. The system according to claim 9, wherein the pre-defined method is a largest response time method wherein a largest value of the response time in the storage array is used for computing the optimal timeout value.

11. The system according to claim 9, wherein the pre-defined method is a heuristics or statistics calculation method wherein average values and standard deviations derived from values of the response time in the storage array are used for computing the optimal timeout value.

12. The system according to claim 7, wherein the means for resetting further comprises:

means for receiving the optimal timeout value from a pre-defined method executed by an additional module, means for using, by the additional module, the optimal timeout value to reset the timeout value associated with the binding handle, and means for setting the timeout value with the optimal timeout value when the remote procedure call is made from the client system to the server system through the binding handle during a next remote procedure call.

13. A program product on a computer-usable medium for determining an adaptive timeout value setting in distributed computing environment (DCE) applications for a client/server pair having a client system and a server system, comprising the steps of:

instruction means for tracking a server response time of the server system to a remote procedure call from the client system, wherein the remote procedure call includes a binding handle, and wherein the server response time is based on a time of the server system responding to the remote procedure, instruction means for calculating an optimal timeout value from the response time, and instruction means for resetting a timeout value of the binding handle as the optimal timeout value.

14. The program product according to claim 13, wherein the instruction means for tracking further comprises:

instruction means for obtaining, by the client system, the binding handle to communicate with the server system, instruction means for populating, by the client system, the binding handle with attributes to be used for the remote procedure call with the binding handle, instruction means for setting and referring to an initial value for the timeout value of the binding handle when one of the remote procedure call is made, instruction means for invoking additional code that is added around an internal remote procedure call application programming interface which is called in correspondence to the remote procedure call to set a timer before the remote procedure call is made and to record the response time after the remote procedure call is returned, and instruction means for recording the response time in a storage array having a number of array elements wherein one of the array elements corresponds to the response time for the remote procedure call.

15. The program product according to claim 13, wherein the instruction means for calculating further comprises:

instruction means for invoking an additional module that is added to a runtime of the remote procedure call to execute a pre-defined method, and instruction means for obtaining the optimal timeout value for the remote procedure call associated with the binding handle from the pre-defined method.

16. The program product according to claim 15, wherein the pre-defined method is a largest response time method wherein a largest value of the response time in the storage array is used for computing the optimal timeout value.

17. The program product according to claim 15, wherein the pre-defined method is a heuristics or statistics calculation method wherein average values and standard deviations derived from values of the response time in the storage array are used for computing the optimal timeout value.

18. The program product according to claim 13, wherein the instruction means for resetting further comprises:

instruction means for receiving the optimal timeout value from a pre-defined method executed by an additional module, instruction means for using, by the additional module, the optimal timeout value to reset the timeout value associated with the binding handle, and instruction means for setting the timeout value with the optimal timeout value when the remote procedure call is made from the client system to the server system through the binding handle during a next remote procedure call.

* * * * *

UNITED STATES PATENT AND TRADEMARK OFFICE
CERTIFICATE OF CORRECTION

PATENT NO.    : 6,526,433 B1
DATED         : February 25, 2003
INVENTOR(S)   : Chang et al.

It is certified that error appears in the above-identified patent and that said Letters Patent is hereby corrected as shown below:

Column 1,
Line 32, please insert -- chosen -- after "value is".

Signed and Sealed this

First Day of July, 2003

JAMES E. ROGAN
*Director of the United States Patent and Trademark Office*